United States Patent
Stephens et al.

(10) Patent No.: US 7,739,158 B2
(45) Date of Patent: Jun. 15, 2010

(54) METHOD AND SYSTEM FOR IMPLEMENTING MULTIPLE EXCHANGES WITHIN A COMMON INSTANCE

(75) Inventors: Dave Stephens, Merced, CA (US); Kevin Miller, Granite Bay, CA (US); Vance Checketts, San Mateo, CA (US); Seth Stafford, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 541 days.

(21) Appl. No.: 09/730,612

(22) Filed: Dec. 5, 2000

(65) Prior Publication Data

US 2002/0069120 A1 Jun. 6, 2002

(51) Int. Cl.
*G06F 17/30* (2006.01)
(52) U.S. Cl. .............................. 705/27; 705/26; 707/100
(58) Field of Classification Search .................... 705/26, 705/27; 707/100
See application file for complete search history.

(56) References Cited

U.S. PATENT DOCUMENTS

| | | | | |
|---|---|---|---|---|
| 5,319,542 | A * | 6/1994 | King et al. | 705/27 |
| 5,701,460 | A * | 12/1997 | Kaplan et al. | 707/3 |
| 6,519,568 | B1 * | 2/2003 | Harvey et al. | 705/1 |
| 6,650,433 | B1 * | 11/2003 | Keane et al. | 358/1.15 |
| 6,772,216 | B1 * | 8/2004 | Ankireddipally et al. | 709/230 |
| 6,901,380 | B1 * | 5/2005 | Bremers | 705/27 |

OTHER PUBLICATIONS

Covisint1, webpages from http://web.archive.org/web/*/http:http://www.covisint.com, dated Nov. 10, 2000 and before to Aug. 15, 2000, 39 pages.*

Covisint2, Covisent gets green light: automotive trading exchange passes FTC, Purchasing B2B.*

Wilson, Tim, "RosettaNet in high gear—Supply chain group enlists auto industry", Internetweek, Jul. 10, 2000.*

White, Gregory, E-ssembly lines: how GM, Ford think web can make splash on the factory floor—by forcing suppliers online, car makers may ignite new internet sales boom—'a dirty, difficult process', dated Dec. 3, 1999.* e-hub1, M2 Presswire "Infobank: Infobank launches e-hub, enabling firms to set up bespoke e-commerce trading communities" dated Jun. 25, 1999.*

(Continued)

*Primary Examiner*—Mark Fadok
(74) *Attorney, Agent, or Firm*—Townsend and Townsend and Crew LLP

(57) ABSTRACT

A multiple exchange instance for facilitating business to business e-commerce. The multiple exchange instance includes a plurality of exchanges. Each of the plurality of exchanges are implemented within a common instance. The plurality of exchanges share a set of common components to avoid redundancy. The plurality of exchanges are each provided with a respective view having respective unique components asked her the requirements of their respective exchange operators. The multiple exchanges within the common instance facilitate communication between the exchanges. The multiple exchanges each have their respective users, and the common instance allows the users to perform input/output using the common components. The multiple exchanges are configured to use communication protocols to communicate with processes external to the common instance. The common instance is implemented using a database program running on one or more computer systems.

21 Claims, 5 Drawing Sheets

OTHER PUBLICATIONS e-hub2, McKendrick, XML-based document format shows promise for high-tech hubs, ENT, Sep. 1999.* e-hub3, PR Newswire, "Infobank International selected by ICL to power its new Pan-european business to business internet trading community" Nov. 17, 1999.* e-hub4, Leading industrial processing ehub developers address net market makers' net-market@ground.zero(2) conference, PR Newswire, Nov. 12, 1999.*

SAP1, McKendrick, SAP remolds itself as a Dot-Com Co., ENT, Oct. 6, 1999.*

SAP2, Webpagefrom mysap.com, http://web.archive.org/web/20000706195505/http://mysap.com, dated Jul. 6, 2000.*

Phillips.et al, "The B2B internet report Colaborative commerce", Morgan Stanley Dean Witter, dated Apr. 2000.*

Covisent3, Skapinker, "Alliances for the greater purchasing good: E-Business by Michael Skapinker: The creation of online business-to-business exchanges serving the needs of large multinationals reflects a new", Financial Times, Nov. 17, 2000.* e-hub4, Zwang, E-business for E-print, American Printer, Nov. 1999.*

Oracle1, Business: Riding the storm, The Economist, Nov. 6, 1999.*

Oracle2, Oracle2, Sata et al, Oracle announces Oracle® applications release 11i, Oracle press release, Sep. 27, 1999.*

Oracle3, Myron, ASP supply chain—Ford, Oracle Bombshell, VARbusiness, Nov. 8, 1999.*

Oracle4, Oracle opens registration for Oracle exchange online marketplace to all, PR Newswire, Nov. 15, 1999.*

Oracle5, "Oracle opens registration for online market service", Businessworld, Nov. 26, 1999.*

Oracle6, Lee, "Oracle focuses on e-business", New Straits Times, Nov. 18, 1999.*

Oracle7, "Oracle software cornerstone for business to business exchanges; e-business integration software will excelerate adoption of online exchanges", PR Newswire, Nov. 15, 1999.*

Covisint2.1, MacDuffie, John, "E-volving the auto industry: E-Commerce effects on consumer and supplier relationships", dated Sep. 12, 2000. This is an article referenced in Covisent2 and is therefore included in its entirety.*

Covisent2.1.1 Glushko, Robert, "How XML enables internet trading communities and Marketplaces", working paper CommerceOne, 1999.This is an article referenced in Covisent2.1 and is therefore included in its entirety.*

* cited by examiner

METHOD AND SYSTEM FOR IMPLEMENTING MULTIPLE EXCHANGES WITHIN A COMMON INSTANCE

FIELD OF THE INVENTION

The field of the present invention pertains to efficient implementation and management of electronic commerce entities on a distributed computer network. More particularly, the present invention relates to a method and system for the implementation of multiple electronic commerce exchanges within a single instance.

BACKGROUND OF THE INVENTION

Buyers and sellers use a variety of techniques to ensure goods and services meet their mutual expectations. However, traditional procurement systems have been proven to be error prone, labor intensive, and costly operations. For example, often times, when a buyer is looking to purchase a batch of articles, a buyer might negotiate terms for the purchase prior to making the purchasing decision. The negotiation allows the buyer and seller to ensure the articles and terms (e.g., price, quantity, delivery conditions, etc.) will meet any specific requirements. As is generally known, it is advantageous to consider many alternative buyers/sellers when negotiating terms. A larger number of buyers and sellers available, for example, to bid on articles of manufacture, usually leads to a more efficient matching of requirements between buyers and sellers (e.g., getting the best deal). Traditional buying and selling mediums, such as auctions, catalog based purchasing, and selling, and the like, do not always facilitate the most efficient matching of requirements. Alternatively, when prior inspection of an article is not possible or practical, the seller may provide the buyer with specifications describing the properties of the articles. The recent ascendancy of electronic commerce provides a means of avoiding, or at least reducing, the problems presented by the use of traditional buying and selling mediums.

In many respects, the Internet and the World Wide Web based network technologies have largely eliminated the most labor intensive and costly portions of the buying and selling type commerce operations (e.g., the use of mass mailings, printed specifications, catalogs, updating preprinted product information, etc.). However, many of the old problems still remain. For example, the fact that a buyer may find a seller from whom to purchase a batch of articles "on-line", does not change the fact that the buyer might not be aware of a more favorable purchase opportunity from a different seller prior to making the purchasing decision. Even when negotiation and/or inspection of all articles from all possible sellers is not practical, the buyer would find very helpful a comprehensive system for gathering offers from a large, widely distributed number of sellers.

To avoid these problems, a variety of electronic commerce facilitating schemes were developed. One such scheme involved the use of business-to-business buying and selling exchanges implemented on the Internet. The term "electronic commerce" or "e-commerce" originally evolved from remote forms of electronic shopping to mean all aspects of business and market processes enabled by wide area communications networks, namely, the Internet and the World Wide Web based network technologies. E-commerce is a rapidly growing field, and is generally understood to mean doing business on-line or selling and buying products and services through Web (e.g., Internet based) storefronts or through other similar distributed computer networks. In general, electronic commerce is substantially similar to the more traditional catalog based commerce schemes. The business-to-business e-commerce exchanges, or simply "B2B exchanges" have evolved to focus on the specific needs and requirements of buying and selling between businesses.

As the use of B2B exchanges have proliferated, a trend has emerged wherein each major business to business player wanted to implement its own business to business exchange. Each major business to business player implements its own business to business exchange using its own in-house engineering team, or more commonly, out-sources the task of designing and implementing the exchange to a specialized external service provider (e.g., an ASP specializing in the implementation and maintenance of exchanges for companies). This approach has led to a number of inefficiencies. The most prominent of which is the fact that the implementation and maintenance of many separate exchanges leads to unnecessary duplication and redundancy.

Generally, each exchange implemented for each business entity is implemented as a separate "instance." Hence, multiple exchanges each reside within their own instance, regardless of how related or similar they are, or the business relationship between their respective operators. For example, for companies in similar lines of business, their respective exchanges will have a majority of their components in common. One example would be the exchanges operated by two different automobile manufacturing companies. Their respective exchanges would not be identical, however, the vast majority of their components would be common. The separate instance for each exchange leads to duplication of components and duplication of costs. Additionally, the task of creating an exchange involves a significant amount of work.

Prior art FIG. 1 shows a diagram 100 of a plurality of each commerce sites as implemented in accordance with the prior art. As depicted in FIG. 1, system 100 includes a plurality of e-commerce sites 101-104 running independently (e.g., within their own instance on their own dedicated hardware). The sites 101-104 are coupled to a distributed computer network 150 (e.g., the Internet) and are accessed by a plurality of clients 161-164.

The separate instances per e-commerce site 101-104 leads to an additional problem regarding efficient communication between sites, hereafter referred to as exchanges. The separate exchanges each running within their own instance cannot easily communicate amongst each other. Unfortunately, communication between the various players involved in a business community is a fundamental commerce facilitating process. Communication between multiple exchanges when each exchange is running as its own instance is not easily implemented. One prior art solution for addressing this problem involves the use of new communication technologies for communicating between processes running in separate instances. For example, "XML" is a communication technology being developed to communicate between instances/exchanges over the Internet (e.g., distributed computer network 150). However, XML is a relatively new technology, and is not yet fully developed.

Thus, for example, a supplier looking to sell articles on an operator's exchange needs to duplicate communication for each exchange operating in the line of business (e.g., selling car parts to each of a number of automobile manufacturers). This includes duplicate communication regarding common catalogs, common price lists, common password authentication and/or registration for suppliers to an exchange, pushing catalog content completely to each exchange (e.g., a supplier can sell catalogs of parts to Ford, GM, Chrysler, etc.), and the like. For example, this often involves registering and/or authenticating a supplier's identity at least once for each of the exchanges and going through the communication process of pushing catalog content to each of the exchanges redundantly.

Thus, what is required is a solution that solves the limitations of the prior art. What is required is a solution for implementing multiple exchanges which overcomes the communication problems inherent between the various exchanges. What is required is a solution that eliminates the redundancy and duplicate components involved in implementing multiple exchanges. What is required is a solution that eliminates repetitive communication actions required of buyers/sellers utilizing the exchanges. The present invention provides a novel solution to these requirements.

SUMMARY OF THE INVENTION

The present invention provides a solution for implementing multiple exchanges which overcomes the communication problems inherent between the various exchanges. The present invention provides a solution that eliminates the redundancy and duplicate components involved in implementing multiple exchanges. The present invention provides a solution that eliminates repetitive communication actions required of buyers/sellers utilizing the exchanges.

In one embodiment, the present invention is implemented as a software based multiple exchange instance for facilitating business to business e-commerce between different companies (e.g., customers, trading partners, and the like). The multiple exchange instance includes a plurality of exchanges, for example, within a line of business (e.g., different automobile manufacturers). Each of the plurality of exchanges are implemented within a common instance. The plurality of exchanges share a set of common components to avoid redundancy. The plurality of exchanges are each provided with a respective view having respective unique components as per the requirements of their respective exchange operators (e.g., Ford, GM, etc.). The multiple exchanges within the common instance facilitates communication between the exchanges. The multiple exchanges each have their respective users (e.g., trading partners, etc.), and the common instance allows the users to perform input/output using the common components. The multiple exchanges are configured to use communication protocols to communicate with processes external to the common instance. The common instance is implemented using a database program running on one or more computer systems (e.g., one or more large servers).

Thus, in accordance with the present invention, exchanges with a high degree of commonality are implemented within a common instance. The exchange owners/operators are presented with their own respective customized views into the common instance. This provides for far more efficient communication between exchanges. Exchanges within a common instance can communicate amongst each other much more quickly and reliably than exchanges implemented within their own respective instances. Hence, for example, trading partners in a common line of business are able to utilize common catalogs, common price lists, common password authentication and/or registration for buyers for a group of exchanges, pushing catalog content once to each exchange (e.g., a trading partner can sell catalogs of parts to Ford, GM, etc.), by registering once and pushing catalog content, including prices, to each of the exchanges. The exchange owner/operator sees no difference. The multi-exchange instance of the present invention will appear to each owners/operator as if they are running their own exchange.

In so doing, the present invention provides a solution for implementing multiple exchanges which overcomes the communication problems inherent between the various exchanges. The multiple exchange instance eliminates the redundancy and duplicate components involved in implementing multiple exchanges and eliminates repetitive communication actions required of buyers/sellers utilizing the exchanges.

BRIEF DESCRIPTION OF THE DRAWINGS

The present invention is illustrated by way of example and not by way of limitation, in the figures of the accompanying drawings and in which like reference numerals refer to similar elements and in which.

Prior art

DETAILED DESCRIPTION OF THE INVENTION

Figure 1:
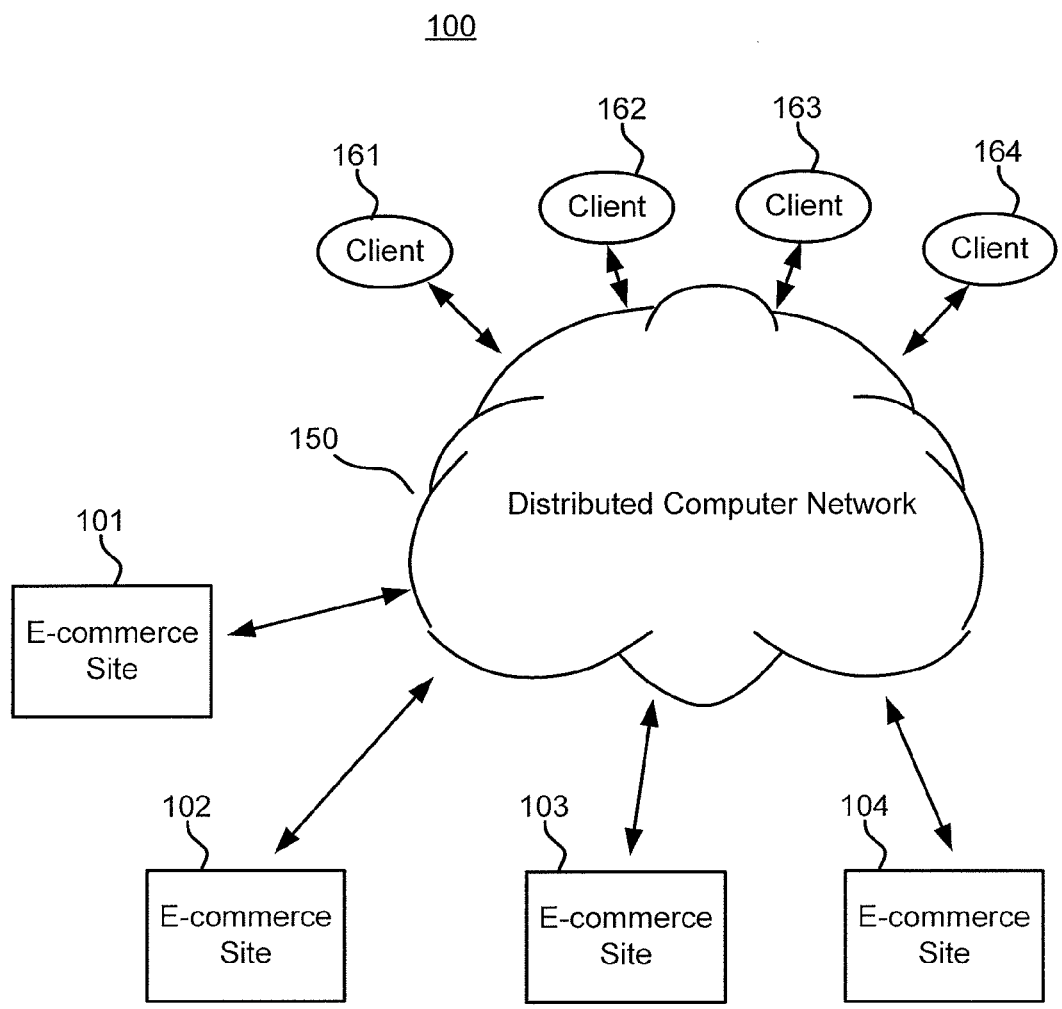
FIG. 1 shows a diagram of a plurality of e-commerce sites as implemented in accordance with the prior art.

Reference will now be made in detail to the embodiments of the invention, examples of which are illustrated in the accompanying drawings While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a solution for implementing multiple exchanges which overcomes the communication problems inherent between the various exchanges. The present invention provides a solution that eliminates the redundancy and duplicate components involved in implementing multiple exchanges. The present invention provides a solution that eliminates repetitive communication actions required of buyers/sellers utilizing the exchanges. The present invention and its benefits are further described below.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

METHOD AND SYSTEM OF THE INVENTION

Figure 2:
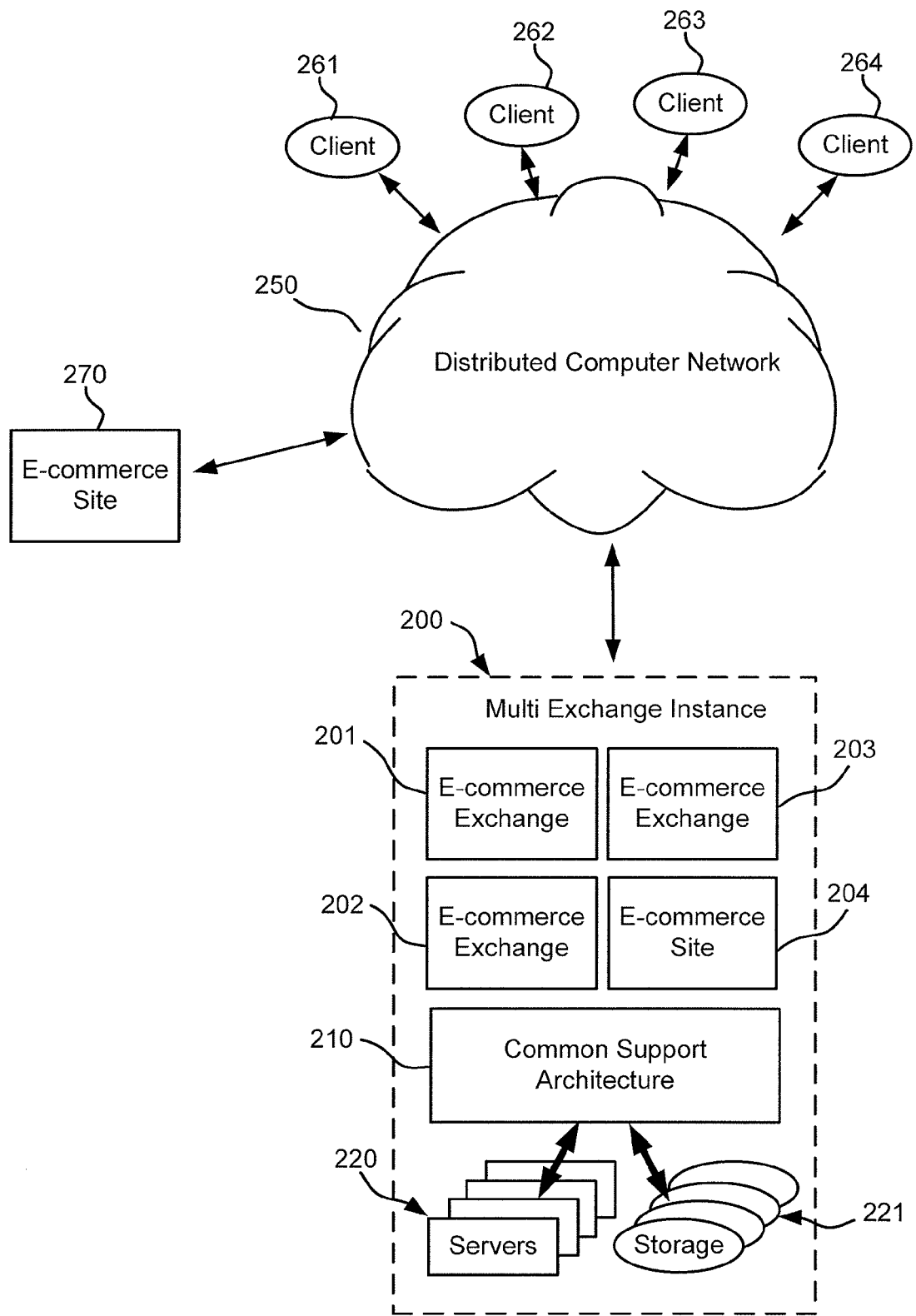
FIG. 2 shows a diagram of a multi-exchange instance in accordance with one embodiment of the present invention.

Referring now to FIG. 2, a diagram of a multi-exchange instance 200 in accordance with one embodiment of the present invention is shown. As depicted in FIG. 2, system 200 includes a plurality of e-commerce exchanges 201-204 running within the common multi-exchange instance 200. The e-commerce exchanges 201-204, hereafter exchanges 201-204, run on top of a common support architecture 210. The exchanges 201-204 and common support architecture 210 all execute on one or more servers 220 and one or more storage systems 221, that function as the computer system platform for the software based functionality of the present invention (e.g., exchanges 201-204 and common support architecture 210). The multi-exchange instance 200 is coupled to a distributed computer network 250. The distributed computer network 250 comprises, for example, the Internet. FIG. 2 also depicts a plurality of clients 261-264 and an e-commerce site 270 also coupled to network 250.

In the present embodiment, the exchanges 201-204 and common support architecture 210 that comprise the multi-exchange instance 200 are implemented as a software based components for facilitating business to business e-commerce between different companies (e.g., customers, trading partners, and the like). The multiple exchanges 201-204 are used to implement respective e-commerce exchanges, for example, within a comparatively common line of business (e.g., different automobile manufacturers, each manufacturer operating a respective one of exchanges 201-204).

The multiple exchanges 201-204 each have their respective users, (e.g., trading partners, etc.), and the common instance allows the users to perform input/output using the common components provided by the common support architecture 210. Thus, for example, clients 261-264 (e.g., trading partners, etc.), interact with the exchanges 201-204 by accessing them via the distributed computer network 250 (e.g., the Internet), and having authentication, registration, communication services, and the like, performed by the common support architecture 210.

It should be noted that the trading partners depicted as clients 261-264 can represent buying or selling organizations. Thus, a trading partner can be an organization that sells supplies, services, etc. to other exchange participants or an organization that buys supplies, services, etc. from other exchange participants. It should also be noted that an exchange can include many different buying organizations and many different selling organizations. As such, an exchange implementation is not limited to, for example, a single manufacturer operating its own respective one exchange. The nature of the participants of each exchange can be tailored to the particular requirements of the exchange owner/operator.

Each of exchanges 201-204 are implemented within the common instance 200. As such, communication between the exchanges 201-204 is more efficient. The multiple exchanges within the common instance facilitates communication between the exchanges. The exchanges 201-204 share a set of common components, the common support architecture 210, to avoid the redundant duplication of these components with each exchange. This aspect of the embodiment allows a user, for example client 261, to perform common communication operations (e.g., updating price lists for various parts) one time for all exchanges 201-204 within the instance 200.

The multiple exchanges are configured to use communication protocols to communicate with processes external to the common instance. For example, industry standard communication protocols such as XML can be used to implement communication between the exchanges 201-204 and the external e-commerce site 270. The communication protocols (e.g., XML, etc.) are designed to facilitate secure communication between independent processes. The term "XML" is an acronym standing for extensible markup language, which is an open standard for describing data from the World Wide Web standards body. XML is used for defining data elements within Web pages as used by business to business documents, and is being extensively developed and refined to provide support for business to business transactions. The multiple exchanges 201-204 can be configured to use XML to implement communications with external processes such as the external e-commerce site 270.

The exchanges 201-204 are each provided with a respective view having respective unique components as per the requirements of their respective exchange operators. For example, continuing the automobile manufacturer example from above, each exchange operator, such as, for example, Ford, GM, or the like, would have its own respective view into the shared multi-exchange instance 200. Each exchange operator would have its own respective one of the exchanges 201-204 that would be customized in accordance with the operator's particular requirements.

The common instance is implemented using a database program running on one or more computer systems. A powerful relational database program (e.g., Oracle 8) can be used to implement the single common instance 200. The database program runs on top of, for example, one or more servers 220 (e.g., scaleable multi-processor servers) coupled to one or more storage systems 221 (e.g., large disk arrays).

The term "common instance" as referred to herein is a logical concept representing the fact that the data structures comprising the exchanges 201-204 reside within a common "schema" that defines the contents of the database. As known by those skilled in the art, the term "schema" refers to a definition of an entire database. The schema defines the structure and type of contents that each data element within the structure can contain (e.g., table structures, etc.). Each of the exchanges 201-204 can be configured as "sub-schemas" that provide a partial view or customized view of the entire database. Hence, the common instance is "striped" to give the exchange operators their own exchanges (e.g., as in painting a stripe on the data which color codes for the respective owner/operator). In other words, in the present embodiment, the single schema of the common instance 200 is sliced into multiple exchanges 201-204.

Figure 3:
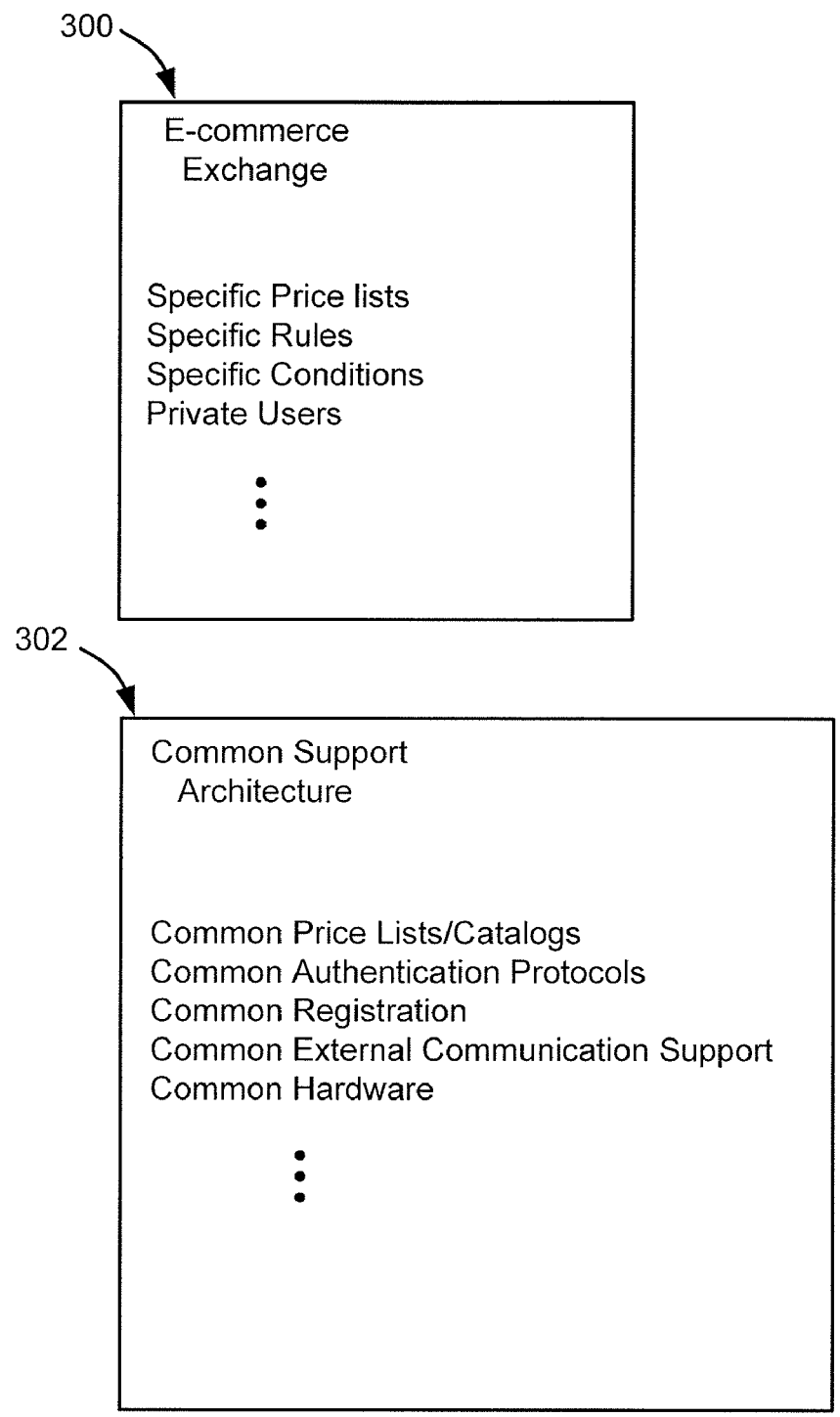
FIG. 3 shows a diagram depicting one relationship between the unique components of the multiple exchanges of the present invention and the common components of the common support architecture of the present invention.

Referring now to FIG. 3, a diagram 300 showing the relationship between the unique components of the commerce exchanges 201-204 and the common components of the common support architecture 210 in accordance with one embodiment of present invention is shown.

As described above, implementing the multiple exchanges 201-204 provides for far more efficient communication between the exchanges. Each of exchanges 201-204 are implemented within the common instance 200, however, the exchanges 201-204 are configured to present their unique views to their respective exchange operators and users. Thus, for example, suppliers in a common line of business are able to utilize common catalogs, common authentication protocols, common registration procedures, common external commutation support, common hardware, and the like, as shown in common support architecture 302 in FIG. 3. Simultaneously, each exchange operator can maintain specific price lists, specific rules, specific buying and selling conditions, specific lists of authorized users, and the like, unique and customized in accordance with their particular requirements. This allows, for example, each exchange operator to publish common price lists, utilize common password authentication and/or registration for buyers for a group of exchanges, execute the pushing catalog content once to each exchange (e.g., a supplier can sell catalogs of parts to Ford, GM, etc.), and the like, by registering once and pushing catalog content including prices to each of the exchanges 201-204. With respect to the distinction between multiple exchanges within the common instance or a single instance per exchange, the exchange owner/operator sees no difference. The multi-exchange instance of the present invention will appear to each owner/operator if they are running their own exchange.

Figure 4:
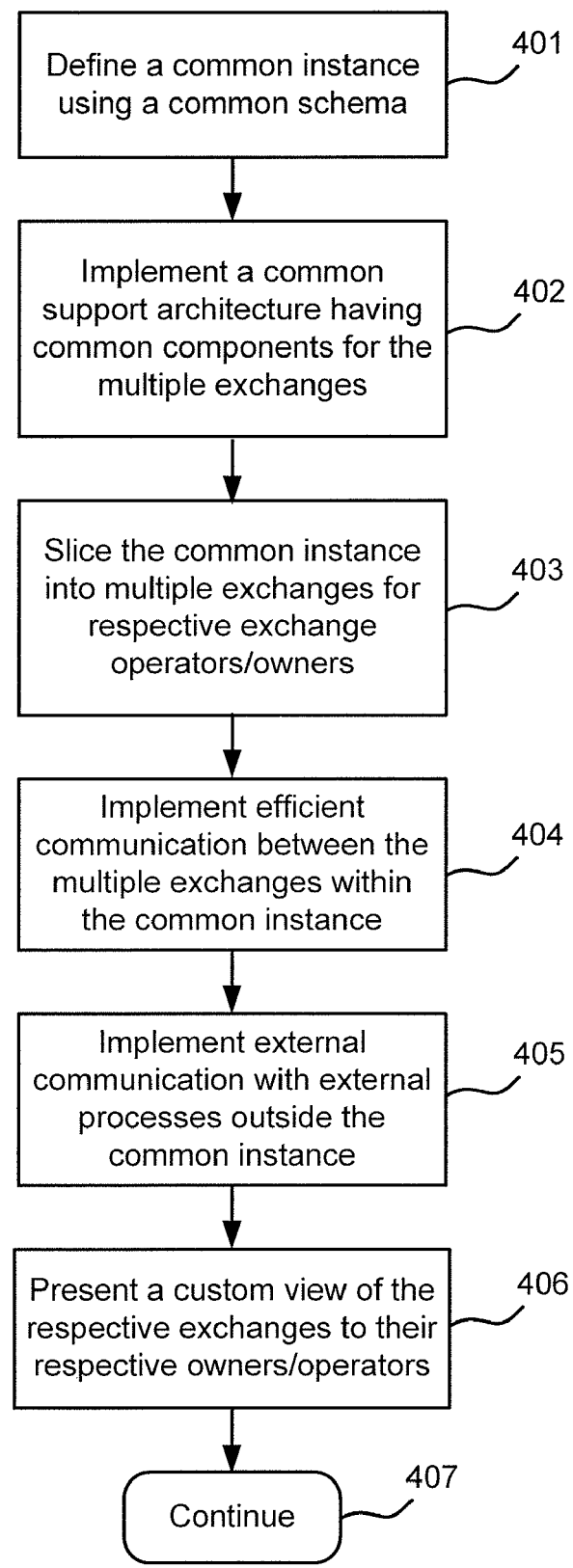
FIG. 4 shows a flow chart of the steps of a multi-exchange operating process in accordance with one embodiment of the present invention.

Referring now to FIG. 4, a flow chart of a multi-exchange operating process 400 in accordance with one embodiment of the present invention is shown. Process 400 depicts the steps involved in defining and operating a system of multiple exchanges within a common instance, for example, system 200 of FIG. 2.

Process 400 begins in step 401, where a common instance having a single overall common schema is defined. As described above, the common instance refers to the fact that the data structures comprising the functionality of the present invention are defined within a common schema that defines the contents of the data base. In step 402, a common support architecture (e.g., common support architecture 210) is implemented to support the multiple exchanges. As described above, the common support architecture includes common components required by each of the exchanges. In step 403, the common instance is sliced into multiple exchanges (e.g., exchanges 201-204 of FIG. 2) for use by respective exchange owner/operators. Each of the resulting exchanges comprise sub-schemas that provide partial or customized views of the overall data base to the respective owner/operator.

Referring still to process 400 of FIG. 4, in step 404, efficient communication is implemented between the multiple exchanges by utilizing the common components of the common support architecture. As described above, since the exchanges reside within the common instance, messages can be easily passed between them. In step 405, external communication with external processes outside the common instance is implemented. Communication with external processes, for example, via the Internet, can be implemented using industry standard communication protocols such as XML. In step 406, a custom view of each of the exchanges is presented to the respective exchange operators/owners. The custom view is created using the unique components of each of the exchanges. As described above, the custom view is tailored in accordance with the specific requirements of the owner/operator. Subsequently, as shown in step 407, the multi-exchange instance continues operation, facilitating commerce operations (e.g., auctions, buying, selling, catalog updates, etc.) for the owner/operators and their authorized users.

Thus, the present invention provides a solution for implementing multiple exchanges which overcomes the communication problems inherent between the various exchanges. The present invention provides a solution that eliminates the redundancy and duplicate components involved in implementing multiple exchanges. Additionally, the present invention provides a solution that eliminates repetitive communication actions required of buyers/sellers utilizing the exchanges.

Computer System Platform

Figure 5:
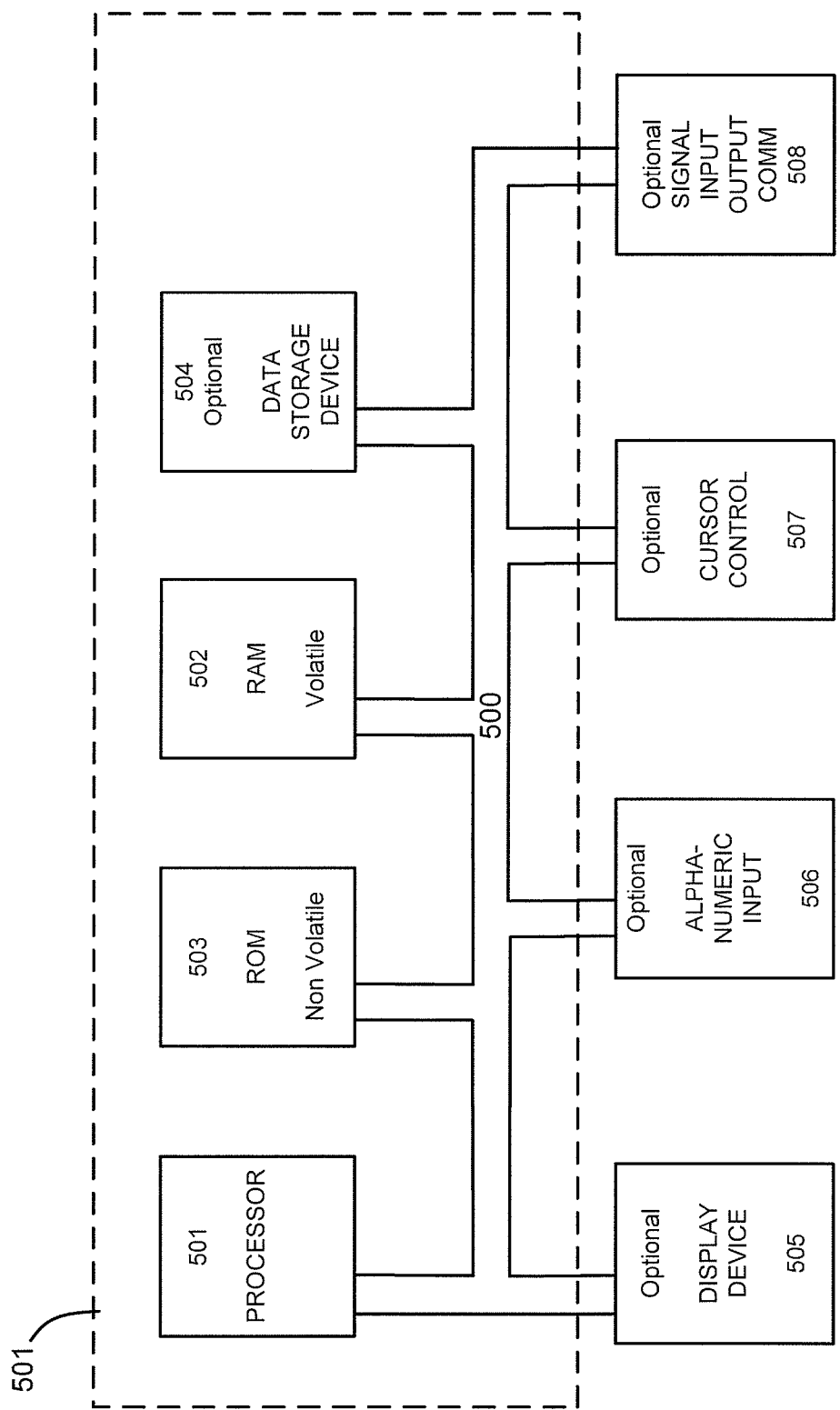
FIG. 5 shows the components of a computer system platform in accordance with one embodiment of the present invention.

With reference now to FIG. 5, a computer system 512 in accordance with one embodiment of the present invention is shown. Computer system 512 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 shows the basic components of a computer system used to implement "server" machines and "client" machines. Computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a signal generating device 508 coupled to the bus 500 for communicating command selections to the processor(s) 501.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A multiple exchange instance, comprising:
a plurality of exchanges; and
a common instance for implementing the exchanges, the exchanges sharing a set of common components and each exchange having a respective view having respective unique components, wherein the common instance comprises a database divided into a plurality of sub-schemas, and wherein each of the exchanges is singularly associated with and implemented within a respective one of the plurality of sub-schemas providing a respective partial view of the common instance, wherein the common components enable a trading partner client of the common instance to perform at least one common communication operation collectively for a plurality of the exchanges, wherein the multiple exchanges each have a respective operator, and wherein the multiple exchange instance performs, for each operator, a collective authentication operation for each of the exchanges using the common components.

2. The multiple exchange instance of claim 1, wherein the multiple exchanges are implemented within the common instance and wherein the common instance facilitates communication between a first exchange of the exchanges and a second exchange of the exchanges.

3. The multiple exchange instance of claim 1 wherein the multiple exchange instance allows each operator to perform input/output using the common components to perform the input/output for each of the respective multiple exchanges.

4. The multiple exchange instance of claim 3, wherein the common input/output comprises a collective catalog content input operation for each of the exchanges.

5. The multiple exchange instance of claim 3, wherein the common input/output comprises a registration operation for each of the exchanges.

6. The multiple exchange instance of claim 1, wherein the multiple exchanges are configured to use communication protocols to communicate with processes external to the common instance.

7. The multiple exchange instance of claim 6 wherein the communication protocol is XML (extensible markup language).

8. The multiple exchange instance of claim 1, wherein the common instance is implemented using a database program running on one or more computer systems.

9. A computer-readable storage medium having stored thereon instructions for causing at least one processor to perform a method for a multiple exchange instance implemented on a server computer system utilizing said at least one processor, the instructions comprising:

a) instructions for causing said at least one processor to define a common instance using a common schema that defines a database;
b) instructions for causing said at least one processor to slice the common instance into a plurality of exchanges, wherein the common instance is divided into a plurality of sub-schemas, and wherein each of the exchanges is singularly associated with and is implemented within a respective one of the plurality of sub-schemas providing a respective partial view of the common instance and wherein each of the exchanges is allocated to a different trading partner and has a respective operator;
c) instructions for causing said at least one processor to implement a common support architecture for the exchanges;
d) instructions for causing said at least one processor to implement efficient communication between a first exchange of the exchanges and a second exchange of the exchanges using the common support architecture; and
e) instructions for causing said at least one processor to present a custom view of the exchanges to respective operators of the exchanges; and
f) instructions for causing said at least one processor to perform, at the direction of a trading partner client of the common instance, at least one common communication operation collectively for a plurality of the exchanges; and
g) instructions for causing said at least one processor to perform, for each operator, a collective authentication operation for each of the exchanges using the common support architecture.

10. The computer-readable storage medium of claim 9, wherein the exchanges share a set of common components within the common support architecture and wherein the custom view has respective unique components.

11. The computer-readable storage medium of claim 9, wherein said instructions for causing said at least one processor to implement efficient communication includes implementing the multiple exchanges within the common instance for facilitating communication between the first exchange and the second exchange.

12. The computer-readable storage medium of claim 9, wherein the instructions further comprise: instructions for causing said at least one processor to perform input/output using the common components for each of the multiple exchanges, the input/output performed by the respective operators.

13. The computer-readable storage medium of claim 12, wherein the common input/output comprises a catalog content input operation for each of the exchanges.

14. The computer-readable storage medium of claim 12, wherein the common input/output comprises a registration operation for each of the exchanges.

15. The computer-readable storage medium of claim 9, wherein the exchanges are configured to use communication protocols to communicate with processes external to the common instance.

16. The computer-readable storage medium of claim 15, wherein the communication protocol is XML (extensible markup language).

17. The computer-readable storage medium of claim 9, wherein said instructions that cause said at least one processor to define comprise instructions that cause said at least one processor to implement the common instance using a database program.

18. A multiple exchange instance, comprising: a plurality of exchanges; and a common database for implementing the exchanges within a common schema, the exchanges sharing a set of common components and each exchange having a respective view having respective unique components, wherein the common schema is divided into a plurality of sub-schemas, and wherein each of the exchanges is singularly associated with and is implemented within a respective one of the plurality of subschemas providing a respective partial view of the common schema, and wherein each of the exchanges is allocated to a different merchant, wherein the exchanges each have a respective operator, and wherein the multiple exchange instance, for each operator, performs a collective authentication operation for a group of the exchanges.

19. The multiple exchange instance of claim 18, wherein the multiple exchange instance provides registration for a group of exchanges simultaneously.

20. The multiple exchange instance of claim 18, wherein the multiple exchange instance allows each operator to perform input/output using the common components to perform the input/output for each of the respective multiple exchanges.

21. The multiple exchange instance of claim 20, wherein the common input/output comprises a registration operation for the group of the exchanges.

* * * * *

UNITED STATES PATENT AND TRADEMARK OFFICE
CERTIFICATE OF CORRECTION

| | | |
|---|---|---|
| PATENT NO. | : 7,739,158 B2 | Page 1 of 1 |
| APPLICATION NO. | : 09/730612 | |
| DATED | : June 15, 2010 | |
| INVENTOR(S) | : Dave Stephens et al. | |

It is certified that error appears in the above-identified patent and that said Letters Patent is hereby corrected as shown below:

On the title page, item (56), in column 2, under "Other Publications", line 1, delete "Convisent" and insert -- Convisint --, therefor.

On the title page, item (56), in column 2, under "Other Publications", line 5, delete "E-ssembly" and insert -- E-assembly --, therefor.

On the title page, in item (57), in column 2, in "Abstract", line 7-8, delete "asked her" and insert -- as per --, therefor.

On page 2, in column 1, under "Other Publications", line 6, delete "ehub" and insert -- e-hub --, therefor.

On page 2, in column 1, under "Other Publications", line 13, delete "Colaborative" and insert -- Collaborative --, therefor.

Signed and Sealed this
Twenty-sixth Day of July, 2011

David J. Kappos
*Director of the United States Patent and Trademark Office*